United States Patent [19]
Brown et al.

[11] Patent Number: 5,828,522
[45] Date of Patent: Oct. 27, 1998

[54] VELOCITY CONTROL OF HEAD LOAD/ UNLOAD MECHANISM IN A DISK DRIVE USING DITHER

[75] Inventors: Dana Henry Brown; Zine-Eddine Boutaghou, both of Rochester, Minn.

[73] Assignee: International Business Machines Corporation, Armonk, N.Y.

[21] Appl. No.: 305,109

[22] Filed: Sep. 13, 1994

[51] Int. Cl.[6] .................................................. G11B 5/54
[52] U.S. Cl. ............................................................. 360/105
[58] Field of Search .................................. 360/105, 106, 360/109, 97–99, 75, 77, 78

[56] References Cited

U.S. PATENT DOCUMENTS

| | | | |
|---|---|---|---|
| 3,984,873 | 10/1976 | Pejcha | 360/105 |
| 4,530,021 | 7/1985 | Cameron | 360/97 |
| 4,755,892 | 7/1988 | Carteau et al. | 360/75 |
| 4,786,994 | 11/1988 | Carteau et al. | 360/75 |
| 4,864,437 | 9/1989 | Couse et al. | 360/75 |
| 4,870,703 | 9/1989 | Augeri et al. | 360/98.07 |
| 5,034,837 | 7/1991 | Schmitz | 360/105 |
| 5,117,318 | 5/1992 | Immler et al. | 360/105 |
| 5,189,575 | 2/1993 | Onooka et al. | 360/105 |
| 5,231,549 | 7/1993 | Morehouse et al. | 360/75 |
| 5,237,472 | 8/1993 | Morehouse et al. | 360/105 |
| 5,384,675 | 1/1995 | Crawforth et al. | 360/97.01 |
| 5,394,281 | 2/1995 | Kajitani | 360/105 |
| 5,455,723 | 10/1995 | Boutaghou et al. | 360/105 |
| 5,550,695 | 8/1996 | Matsumoto | 360/105 |
| 5,585,980 | 12/1996 | Boutaghou | 360/105 |

FOREIGN PATENT DOCUMENTS

| | | |
|---|---|---|
| 92120301 | 11/1992 | European Pat. Off. . |
| 4-258858 | 9/1992 | Japan . |
| 4-349279 | 12/1992 | Japan . |

Primary Examiner—Allen T. Cao
Attorney, Agent, or Firm—Ervin F. Johnston; Terrance A. Meador

[57] ABSTRACT

In a disk drive in which a head disk assembly includes a slider suspension member and a parking ramp on which the suspension member rests when the disk drive is not operating, stiction forces between the suspension member and the parking ramp are overcome by applying simultaneously to the suspension member a dither in the form of rocking micromotion, and a bias force to move the suspension member at a low velocity required for loading a slider onto a disk without damage to the slider/disk interface.

45 Claims, 5 Drawing Sheets

VELOCITY CONTROL OF HEAD LOAD/ UNLOAD MECHANISM IN A DISK DRIVE USING DITHER

BACKGROUND OF THE INVENTION

The invention relates to disk drives and more particularly concerns overcoming stiction forces acting between a slider suspension member and a ramp in a disk drive.

Static friction ("stiction") is a known problem in disk drives. For example, when a slider carrying a magnetic head comes to rest on the surface of a disk, stiction causes the surface of the slider that faces the disk to adhere to the disk surface. Stiction is caused by an increase in the coefficient of friction between the slider and the disk to which humidity, temperature, lubricant, and impurities all contribute.

The stiction problem manifested itself with the advent of the "start-stop in-contact" mode of disk drive operation. In this mode, when a disk drive is turned off, the slider is "parked" on the disk surface. When the drive is powered up for operation, stiction acting between the highly polished and lubricated surfaces of the slider and disk has been found to cause serious problems, including damage to the disk surface, the slider and/or the head suspension assembly that carries the slider.

Various solutions to the stiction problem have been introduced, including the provision of a parking ramp on which the slider suspension assembly is brought to rest. The parking ramp is integral with the disk drive housing and is located adjacent a disk surface. When the disk drive is turned off, the head suspension assembly is rotated and retracted to a parked position in which a portion of the head suspension assembly rests on the ramp above the disk surface. This positions the slider off of, and away from, the disk surface. When the disk drive is turned on, the head suspension assembly is moved off of the ramp to place the slider in a disk surfacing engagement location.

As is known, the head suspension assembly includes a suspension that is coupled to an actuator assembly. The suspension carries a slider at its free end and loads the slider against the disk surface. When the disk spins, its surface carries a thin layer of air whose high velocity counteracts the loading force of the suspension and supports the slider over the disk surface for transduction therewith.

Accordingly, when the disk drive is turned off and the suspension member is parked on the ramp, it continues to exert a loading force directed toward the disk surface. Under prolonged contact, the loading force contributes to stiction between the suspension member and the parking ramp. The stiction acting between the suspension member and the parking ramp poses a threat to the loading and unloading operations in which a slider is moved in a narrow range of velocities to and from a disk engagement location during disk drive operation. The narrow range of velocities is necessary to prevent damage to the slider and to the disk.

As is known, in small form factor disk drives, it is very difficult to sense the velocity of an actuator assembly during loading and unloading operations without the provision of sensors that are external to the disk drive. Moreover, processor costs and processor space limitations inhibit the use of external sensors.

Furthermore, during a loading operation when a suspension assembly is moved from the parked position to the disk surface, the stiction forces can exceed the torque available to move the actuator to which the suspension is coupled. Of course, this will result in failure of the disk drive.

Accordingly, there is a significant need in disk drives, particularly those of a small form factor, to reduce the stiction forces between a head suspension and a parking ramp during load and unload operations.

One solution to the stiction problem in the "start-stop in-contact" disk drives was the use of micromotion to release heads from lubricated magnetic disks. This solution is laid out in U.S. Pat. No. 4,530,021, assigned to the assignee of this application and incorporated herein by reference. Micromotion refers to the inducement of a small amount of oscillatory motion of a head parked on a disk surface, with the motion being radial of the disk and serving to initiate breaking the head free of the stiction forces acting between it and the disk surface. However, in a disk drive utilizing an actuator assembly that includes at least one suspension member for carrying a slider, micromotion of the suspension assembly has not been utilized to overcome stiction forces acting between the suspension assembly and a parking ramp.

One specific solution to the suspension/ramp stiction problem has been to apply a burst of current to the actuator prior to moving it during an unload operation. The current burst results in a burst of motion of the actuator assembly which is intended to overcome stiction. Once the stiction is overcome, very little current is necessary to move the suspension member down the ramp. However, without knowing the magnitude of stiction, it is difficult to know a level at which the current burst is applied. If too large, the burst may accelerate the slider into damaging contact with the disk; if too small, the burst may not dislodge the suspension member at all.

SUMMARY OF THE INVENTION

In accordance with the present invention, stiction force acting between a slider suspension member and a parking ramp are overcome by applying simultaneously a rocking micromotion at a particular frequency ("dither") and a bias force to move the actuator at a low velocity required for loading the slider onto the disk surface without damage to the slider/disk surface interface. The controlled micromotion effectively frees the suspension member from the stiction forces that cause it to adhere to the parking ramp, while the bias force simultaneously loads the slider onto the disk surface for transduction therewith.

DETAILED DESCRIPTION OF THE PREFERRED EMBODIMENT

Figure 1:
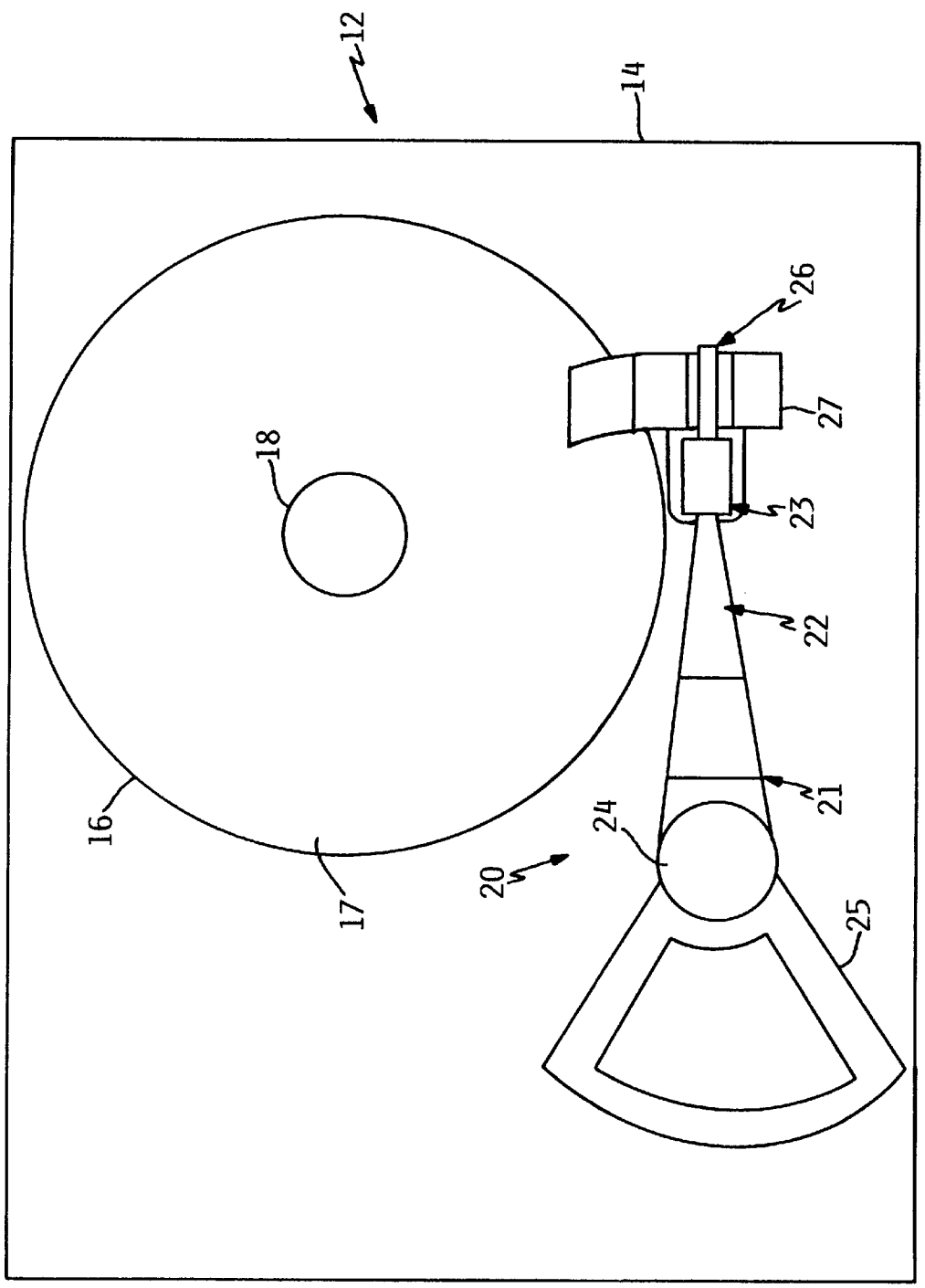
FIG. 1 is a top plan view of a disk drive utilizing a dither technique according to the invention to control load/unload velocity of a slider suspension.

FIG. 1 illustrates a disk drive 12. The disk drive 12 may be referred to as a "disk file", "DASD", or a "rigid disk drive". All of these expressions are equivalent and may be used interchangeably in this description.

The disk drive 12 illustrated in FIG. 1 is not to scale and relative dimensions of its components may be exaggerated for purposes of illustration. The disk drive 12 includes a housing 14 in which is mounted a rigid disk 16 with a surface 17 that is appropriately prepared for transduction of digital information with a magnetic head. The disk 16 is mounted within the drive 12 on a spindle 18 that is coupled to a motor (not shown) which rotates the disk 16 during operation of the disk drive 12.

Also mounted in the disk drive 12 is a rotary head actuator assembly 20. In FIG. 1, the actuator assembly includes a rotary actuator 21 that includes a slider suspension member 22 on which is mounted a slider 23. The actuator assembly 20 rotates on a hub 24. The actuator assembly is driven by a voice-coil motor (VCM)25. The voice coil motor 25 is operated by a servo-loop that rotates the actuator assembly, and with it the suspension member 22 and the slider 23, over the surface 17 of the disk 16 to any desired transducing location for reading or writing information on the disk surface 17. The VCM 25 also rotates the actuator assembly 20 to and from a parked position on a parking ramp 27. The parking ramp 27 is conventionally mounted in the housing 14 to provide a parking position with respect to the disk surface 17. When the actuator assembly 20 is moved to the parked position, a load/unload tang 26 that extends from an end of the suspension member 22 rests on the parking ramp 27, thereby supporting the slider 23 off of, and away from, the portion of the surface 17 on which information is recorded.

The parking ramp arrangement illustrated in FIG. 1 is but one of a number of equivalent arrangements. Alternative embodiments are known which place the parking ramp underneath the suspension member 22 between the actuator and the slider so that the slider extends beyond the outer edge of the parking ramp. In this embodiment, the extension of the suspension member that supports it on the ramp is a portion of the suspension member that extends to the slider. Other arrangements provide cams and actuator-mounted cam followers.

In any head disk assembly that utilizes a parking ramp or cam to implement a "start-stop out-of-contact" mode of disk drive operation, the loading force of the suspension member 22 loads the portion of the actuator assembly that contacts the parking ramp or cam, thereby adding to stiction forces acting between the parking ramp or cam and the portion of the actuator assembly 20 that contacts the parking ramp or cam.

Figure 2:
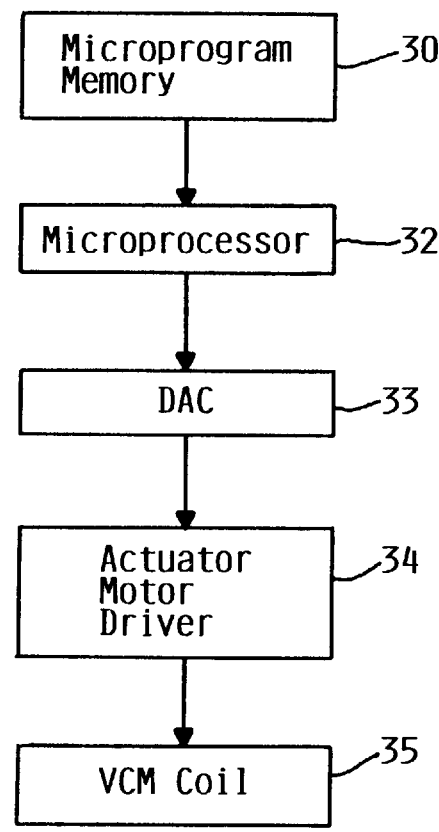
FIG. 2 is a block diagram showing a circuit for controlling a head disk actuator assembly in a disk drive according to the invention.

The means for applying simultaneously dither and a bias force to the VCM 25 is shown in FIG. 2. The means employs conventional drive electronics including a memory 30 storing micro-programs (including a load/unload program according to the invention), and a microprocessor 32 for generating signals to drive the VCM 25. Conventionally, the microprocessor 32 outputs digital signals that are converted to analog form by a digital to analog converter (DAC) 33 whose output is coupled to an actuator motor driver 34 that drives the VCM 25 through a coil 35 that is an integral part of the VCM 25.

Figure 3:
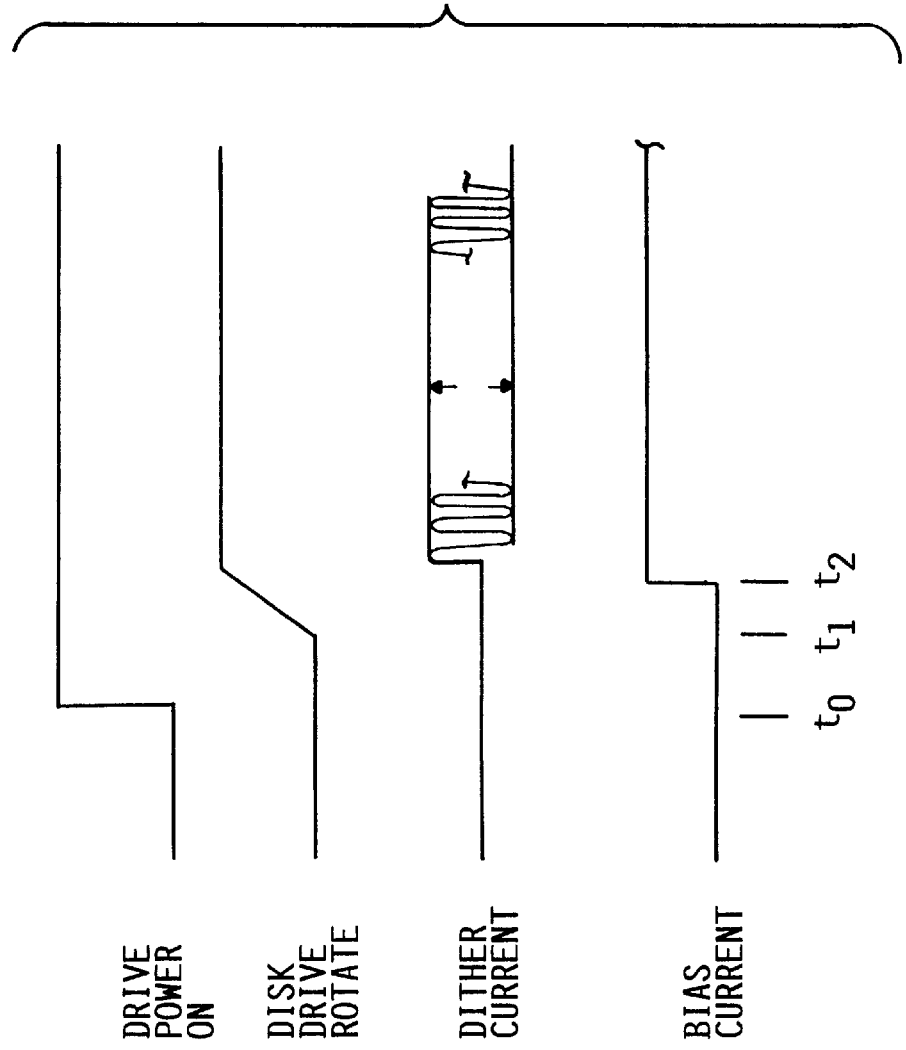
FIG. 3 is a waveform plot illustrating the simultaneous application of dither and load bias to an actuator assembly according to the invention.

FIG. 3 graphically presents the current waveforms employed in the practice of the invention to simultaneously apply dither and bias to move the actuator at the low velocity required for loading a slider onto a disk surface. Time $t_0$ represents the point at which power is applied to the disk drive. Later, at time $t_1$, the disk is rotated. When the disk is at operating speed, the dither and bias signals are applied at time $t_2$.

Figure 4:
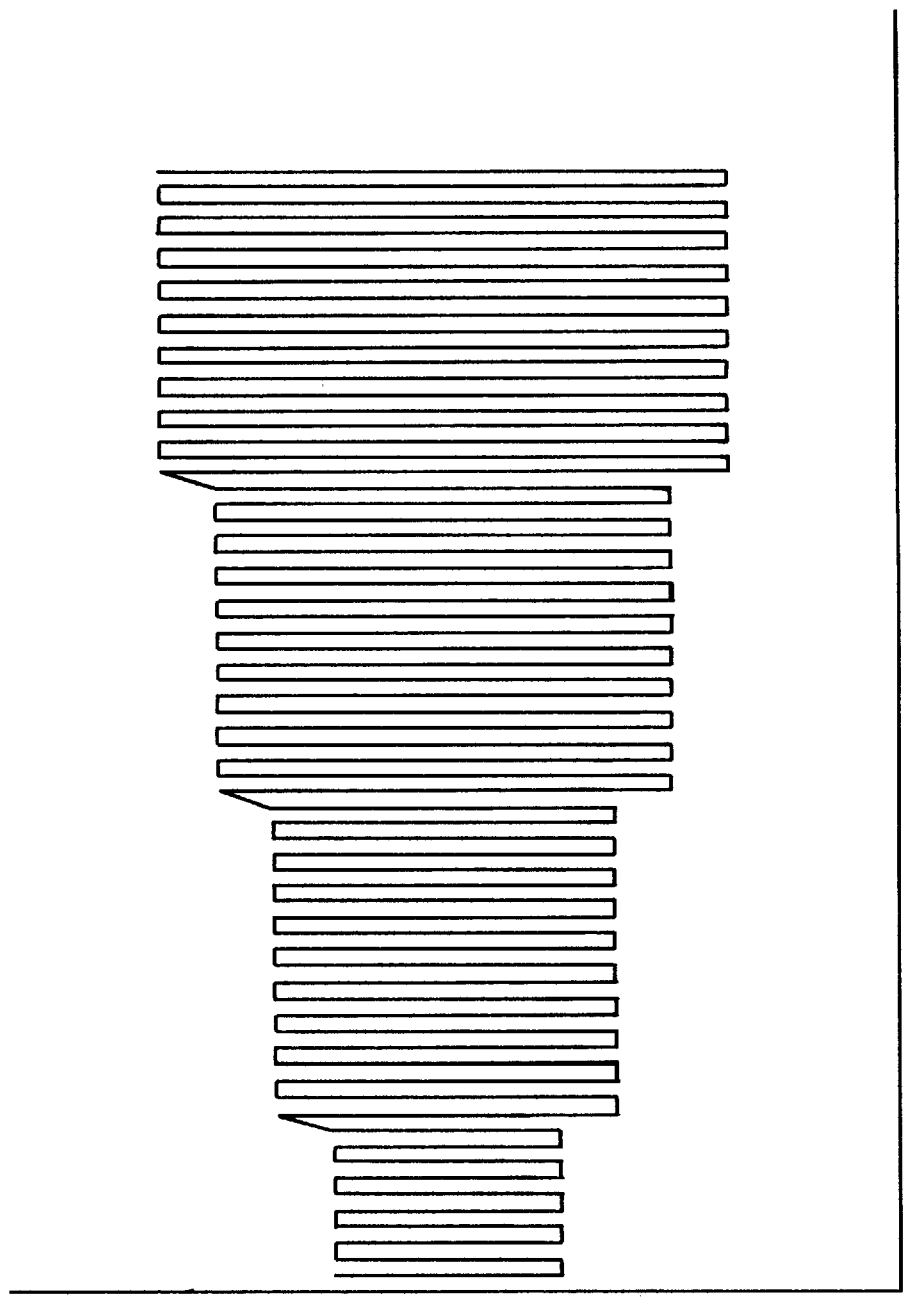
FIG. 4 is a waveform plot illustrating a first dither signal according to the invention.

A first exemplary dither waveform is shown in FIG. 4. In this regard, the waveform is rectangular with successive increases in peak-to-peak magnitude. In this waveform, the increases in magnitude represent action required in the event that stiction forces increases during the life of the disk drive.

Figure 5:
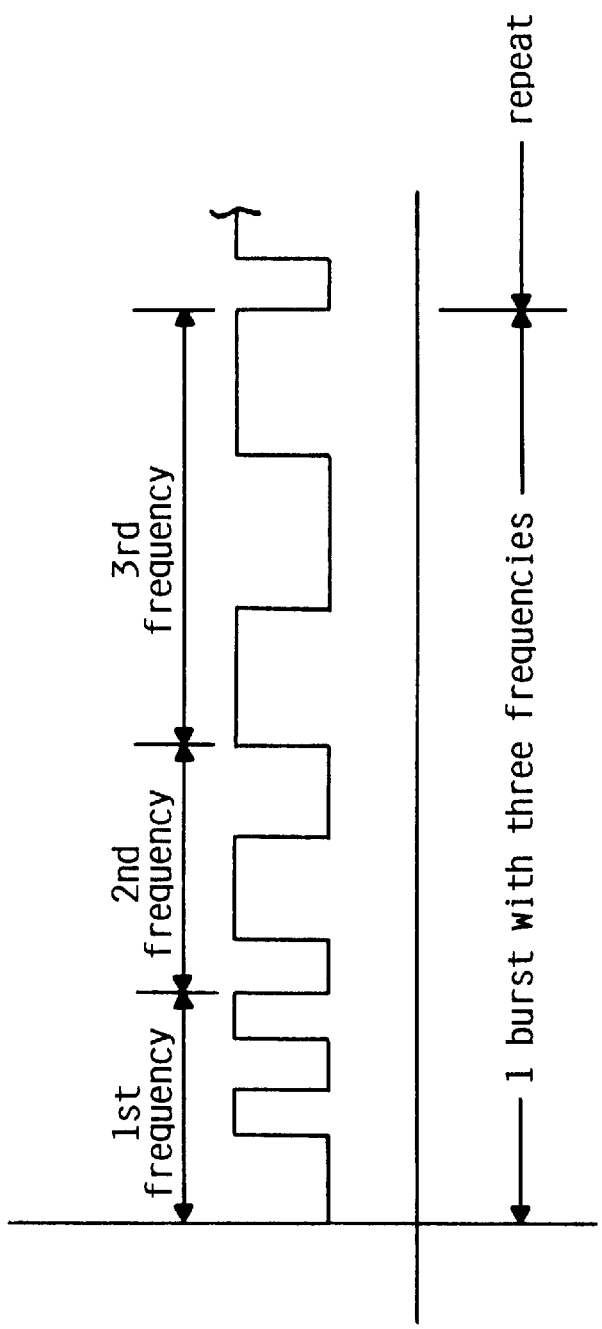
FIG. 5 is a waveform plot illustrating a second dither signal according to the invention.

A second exemplary dither waveform is shown in FIG. 5. In this figure, the suspension member is excited with a variable frequency burst to excite more than one natural mode in the member.

Many other dither signal profiles (triangular, sinusoidal, combination) may be used.

By applying the dither signal to the VCM 25, oscillatory forces are induced in the suspension member 22, which excites the tang with both in-plane and out-of-plane motions. The in-plane and out-of-plane motions overcome the stiction forces between the tang 26 and the parking ramp 27. The bias current is applied simultaneously with dither to the VCM 25 to rotate the actuator assembly 20 and suspension member 22 off the parking ramp and place the slider 23 at a disk engagement location. The combined dither and bias force currents reduce stiction between the parking ramp 27 and the tang 26 and cause the actuator to move at a constant velocity down the ramped portion of the parking ramp 27. The frequencies of the oscillatory signal are chosen to excite various mode of the suspension member 22. Preferably, the modes include the well-known flexure bending and flexure torsion modes, which can be predicted from a finite element program.

The necessary frequencies for exciting the selected modes can be realized using the conventional DASD electronics and a loading program embodied in microcode in the microprogram memory 30. The DAC 33 outputs an analog current waveshape that is the shape of the desired dither waveshape at the selected excitation frequency. The output of the DAC 33 is converted by the actuator motor driver 34 to actuator drive signals that drive the VCM coil 35 with the programmed waveshapes.

In an experiment conducted by the inventors using a disk file of the type illustrated in FIGS. 1 and 2, it was necessary to apply 43 mA of bias current to move a tang down a parking ramp to where a slider was placed in a disk engagement location. Next, with application of a dither signal having a rectangular wave shape and a repetition frequency of 207 Hz with a magnitude of 0.8 v peak-to-peak, only 5 mA of bias current was required to load a slider onto a disk.

Accordingly, the invention affords a means and method for overcoming stiction forces acting between a suspension member and parking ramp without the requirement of additional hardware. Because the dither signal reduces the stiction forces, a slider can be loaded onto a disk at a very low velocity, thereby reducing the danger of slider/disk contact without the requirement to monitor the velocity by additional components.

Clearly, other embodiments and modifications of the present invention will occur readily to those of ordinary skill in the art in view of these teachings. Therefore, this invention is to be limited only by the following claims, which include all such embodiments and modifications.

We claim:

1. A head disk assembly for use in a disk drive which includes a disk, comprising:

a support;

an actuator assembly mounted on the support with at least one suspension member for carrying a slider;

a parking ramp fixed to the support and immovable with respect thereto;

an extension on the suspension member for supporting the suspension member on the ramp in a parked contact position with respect to a disk engagement location, the suspension member and the extension being capable of oscillatory motion;

the slider being located between the extension and said actuator; and means for activating the actuator assembly to produce said oscillatory motion of the suspension member and the extension, whereby stiction force between the extension and the ramp is reduced.

2. The head disk assembly of claim 1, wherein the extension includes a load/unload tang extending from an end of the suspension member.

3. The assembly of claim 1, wherein the oscillatory motion has a predetermined frequency.

4. The assembly of claim 3, wherein the oscillatory motion of the extension includes motion in a plane of the disk and motion out of the plane of the disk.

5. The assembly of claim 4, wherein the extension includes a load/unload tang extending from an end of the suspension member.

6. The assembly of claim 1, wherein the means for activating also activates the actuator assembly to move the suspension member and position the slider at the disk engagement location.

7. A head disk assembly as claimed in claim 1 wherein the means for activating the actuator comprises:

processing circuitry connected to the actuator for simultaneously oscillating the actuator back and forth radially to cause the extension to oscillate back and forth while the extension engages the ramp and radially moving the actuator for positioning the magnetic head and slider adjacent a selected track on the surface of the disk.

8. A head disk assembly as claimed in claim 7 including:
the oscillatory frequency of the actuator increasing over time.

9. A head disk assembly as claimed in claim 7 including:
the oscillatory frequency of the actuator varying in amplitude over time.

10. A head disk assembly as claimed in claim 7 including:
the actuator having an oscillatory frequency which excites flexure bending and flexure torsion modes of the suspension and extension.

11. A head disk assembly as claimed in claim 10 including:
the oscillatory frequency of the actuator increasing over time.

12. A head disk assembly as claimed in claim 10 including:
the oscillatory frequency of the actuator varying in amplitude over time.

13. A head disk assembly as claimed in claim 7 including:
the processing circuitry also being connected to the means for rotating the disk for commencing rotation of the disk prior to oscillating and radially moving the actuator.

14. A head disk assembly as claimed in claim 13 including:
the oscillatory frequency of the actuator increasing over time.

15. A head disk assembly as claimed in claim 13 including:
the oscillatory frequency of the actuator varying in amplitude over time.

16. A head disk assembly as claimed in claim 13 including:
the actuator having an oscillatory frequency which excites flexure bending and flexure torsion modes of the suspension and extension.

17. A head disk assembly as claimed in claim 16 including:
the oscillatory frequency of the actuator increasing over time.

18. A head disk assembly as claimed in claim 16 including:
the oscillatory frequency of the actuator varying in amplitude over time.

19. A disk drive which includes a disk, comprising:

a support;

at least one disk for storing information;

rotation means mounted on the support and coupled to the disk for rotation thereof; a head suspension assembly mounted on the support and including:

an actuator assembly with at least one suspension member for carrying a slider;

a slider mounted on the at least one suspension member;

a ramp fixed to said support and immovable with respect thereto;

an extension on the suspension member for supporting the suspension member on the ramp in a parked contact position with respect to a disk engagement location, the suspension member and the extension being capable of oscillatory motion;

the slider being located between the extension and said actuator; and means for activating the actuator assembly to produce said oscillatory motion of the suspension member and the extension, whereby stiction force between the extension and the ramp is reduced.

20. The disk drive of claim 19, wherein the extension includes a load/unload tang extending from an end of the suspension member.

21. The disk drive of claim 19, wherein the oscillatory motion has a predetermined frequency.

22. The disk drive of claim 21, wherein the oscillatory motion of the extension includes motion in a plane of the disk and motion out of the plane of the disk.

23. The disk drive of claim 22, wherein the extension includes a load/unload tang extending from an end of the suspension member.

24. The disk drive of claim 19, wherein the means for applying is further for applying a bias force to move the actuator and suspension member at a low velocity for placing the slider at the disk engagement location.

25. A method for loading a slider in a disk drive including a suspension member connected at a first end to an actuator and at a second end to a tang, the actuator being capable upon activation of swinging and/or oscillating the suspension member and the tang, the slider being mounted to the suspension member between the tang and said first end, and a parking ramp fixed and immovable relative to the disk drive and engageable with the tang for supporting the suspension member, comprising the steps of:

activating the actuator to cause said oscillatory movement of the tang when the tang engages the parking ramp so as to reduce stiction between the tang and the parking ramp; and substantially simultaneously with activating the actuator to cause said oscillatory movement activating the actuator to cause said swinging movement of the suspension member and the tang for moving the slider toward a disk engagement location.

26. The method of claim 25, wherein the oscillatory motion has a predetermined frequency.

27. The method of claim 26, wherein the oscillatory motion of the extension includes motion in a plane of the disk and motion out of the plane of the disk.

28. A magnetic disk drive with a low powered actuator comprising:

a support:

a magnetic disk having a magnetizable planar surface for storing magnetic information signals;

means mounted on the support for rotating the magnetic disk;

a magnetic head for transducing magnetic information signals to and from the surface of the disk;

an actuator including an actuator arm and a voice coil motor for moving the actuator arm radially back and forth with respect to the surface of the disk;

a slider and a suspension;

the magnetic head being mounted on the slider and the suspension being mounted on the actuator so that selected radial movements of the actuator will position the magnetic head for said transducing along circular tracks on the surface of the disk;

the suspension having an extension which extends beyond the slider away from the actuator;

a ramp fixed to the support and immovable with respect thereto, the ramp having at least a portion beyond the surface of the disk for slidably receiving the extension and supporting the slider and magnetic head in an off disk location; and processing circuitry connected to the actuator for simultaneously oscillating the actuator back and forth radially to cause the extension to oscillate back and forth while the extension engages the ramp and radially moving the actuator for positioning the magnetic head and slider adjacent a selected track on the surface of the disk, whereby any stiction force between the extension and the ramp is minimized thereby lowering power requirements of the actuator.

29. A disk drive as claimed in claim 28 including:

the oscillatory frequency of the actuator increasing over time.

30. A disk drive as claimed in claim 28 including:

the oscillatory frequency of the actuator varying in amplitude over time.

31. A disk drive as claimed in claim 28 including:

the actuator having an oscillatory frequency which excites flexure bending and flexure torsion modes of the suspension and extension.

32. A disk drive as claimed in claim 31 including:

the oscillatory frequency of the actuator increasing over time.

33. A disk drive as claimed in claim 31 including:

the oscillatory frequency of the actuator varying in amplitude over time.

34. A disk drive as claimed in claim 28 including:

the oscillatory frequency simultaneously moving the suspension and its extension back and forth in a plane which is parallel to said surface of the disk and transverse to the back and forth movements.

35. A disk drive as claimed in claim 34 including:

the oscillatory frequency of the actuator increasing over time.

36. A disk drive as claimed in claim 34 including:

the oscillatory frequency of the actuator varying in amplitude over time.

37. A disk drive as claimed in claim 28 including:

the processing circuitry also being connected to the means for rotating the disk for commencing rotation of the disk prior to oscillating and radially moving the actuator.

38. A disk drive as claimed in claim 37 including:

the actuator having an oscillatory frequency which excites flexure bending and flexure torsion modes of the suspension and extension.

39. A disk drive as claimed in claim 38 including:

the oscillatory frequency of the actuator increasing over time.

40. A disk drive as claimed in claim 38 including:

the oscillatory frequency of the actuator varying in amplitude over time.

41. A disk drive as claimed in claim 37 including:

the oscillatory frequency simultaneously moving the suspension and its extension back and forth in a plane which is parallel to said surface of the disk and transverse to the back and forth movements.

42. A disk drive as claimed in claim 41 including:

the oscillatory frequency of the actuator increasing over time.

43. A disk drive as claimed in claim 41 including:

the oscillatory frequency of the actuator varying in amplitude over time.

44. A disk drive as claimed in claim 37 including:

the oscillatory frequency of the actuator increasing over time.

45. A disk drive as claimed in claim 37 including:

the oscillatory frequency of the actuator varying in amplitude over time.

* * * * *